United States Patent
Klivington

(10) Patent No.: US 7,145,952 B1
(45) Date of Patent: Dec. 5, 2006

(54) DYNAMIC SELECTION OF FIELD/FRAME-BASED MPEG VIDEO ENCODING

(75) Inventor: Jason Klivington, Portland, OR (US)

(73) Assignee: Apple Computer, Inc., Cupertino, CA (US)

(*) Notice: Subject to any disclaimer, the term of this patent is extended or adjusted under 35 U.S.C. 154(b) by 398 days.

(21) Appl. No.: 10/041,750

(22) Filed: Jan. 7, 2002

(51) Int. Cl.
H04B 1/66 (2006.01)
(52) U.S. Cl. .............................. 375/240.2; 375/240.24; 375/240.23; 375/240.26; 382/250; 382/246; 348/206
(58) Field of Classification Search ............. 375/240.2, 375/240.18, 240.24, 240.23, 240.13, 240.26; 348/403, 206; 382/250, 246
See application file for complete search history.

(56) References Cited

U.S. PATENT DOCUMENTS

| | | | |
|---|---|---|---|
| 4,821,119 A | | 4/1989 | Gharavi |
| 5,657,086 A | * | 8/1997 | Tahara et al. ........... 375/240.13 |
| 5,659,362 A | | 8/1997 | Kovac et al. |
| 5,737,020 A | * | 4/1998 | Hall et al. ................ 375/240.2 |
| 5,767,910 A | * | 6/1998 | Iizuka ...................... 375/240.2 |
| 5,821,887 A | | 10/1998 | Zhu |
| 5,959,872 A | | 9/1999 | Son |
| 6,351,492 B1 | * | 2/2002 | Kim ....................... 375/240.08 |
| 6,452,970 B1 | | 9/2002 | Kaup |
| 6,473,463 B1 | | 10/2002 | Agarwal |
| 6,731,686 B1 | | 5/2004 | Sudharsanan et al. |

OTHER PUBLICATIONS

"Information Technology—Coding of Moving Pictures and Associated Audio for Digital Storage Media at Up to About 1,5 Mbit/s—Part 2: Video," International Standard, ISO/IEC # 11172, Part 2, 1993, pp. i-113, Published by ISO/IEC, Switzerland.
"Information Technology—Coding of Moving Pictures and Associated Audio for Digital Storage Media at Up to About 1,5 Mbit/s—Part 2: Video," Technical Corrigendum 1, International Standard, ISO/IEC # 11172, Part 2, 1996, pp. 1-2, Published by ISO/IEC, Switzerland.
"Information Technology—Coding of Moving Pictures and Associated Audio for Digital Storage Media at Up to About 1,5 Mbit/s—Part 2: Video," Technical Corrigendum 2, International Standard, ISO/IEC # 11172, Part 2, 1996, pp. 1-5, Published by ISO/IEC, Switzerland.

* cited by examiner

Primary Examiner—Shawn S. An
(74) Attorney, Agent, or Firm—Blakely, Sokoloff, Taylor & Zafman LLP

(57) ABSTRACT

A discrete cosine transform (DCT) level enhancement to Motion Picture Experts Group (MPEG) video encoding is described that results in a more concise bitstream than MPEG encoding without the enhancement. One degree of freedom provided by the MPEG encoding specifications is whether a frame- or field-based DCT operation will be used. In the field-based DCT operations, luminance sub-blocks are built from even or odd rows of the original image, which correspond to the top and bottom fields in field-based video. This allows the encoder to take advantage of the higher correlation between rows for the same field, especially in field-based video with a high level of motion. In one embodiment, both field- and frame-based DCT operations are performed and the results are quantized. On a macroblock-by-macroblock basis, the option that results in the fewest non-zero coefficients is selected and those coefficients are used for run-time encoding.

15 Claims, 4 Drawing Sheets

DYNAMIC SELECTION OF FIELD/FRAME-BASED MPEG VIDEO ENCODING

FIELD

The invention relates to video encoding. More specifically, the invention relates to dynamic selection between field-based encoding and frame-based encoding for Motion Picture Experts Group (MPEG) video encoding.

BACKGROUND

FIG. 1 is a block diagram of a basic Motion Picture Experts Group (MPEG) encoding scheme. The video portion of MPEG-1 encoding is described in detail in International Standards Organization (ISO) document IS 11172, Part 2, "Video" Published Jan. 8, 1990. Subsequent versions of the MPEG video encoding standards (e.g., MPEG-2, MPEG-4) also exist.

If necessary, analog source data is converted by analog-to-digital converter 100 to digital data. The digital data is processed using discrete cosine transform 110. In general, a discrete cosine transform (DCT) is a technique for decomposing a block of data into a weighted sum of spatial frequencies. Each spatial frequency pattern has a corresponding coefficient, which is the amplitude used to represent the contribution of the spatial frequency pattern in the block of data being analyzed. DCT operations and the various implementations are known in the art. See, for example, William B. Pennebaker and Joan L. Mitchell, "JPEG: Still Image Data Compression Standard," Van Nostrand Reinhold, 1993 or K. R. Rao and P. Yip, "Discrete Cosine Transform," Academic Press, 1990.

In a typical MPEG encoding scheme, a frame of an image is divided into macroblocks. Each 16 pixel by 16 pixel macroblock (which is further divided into four 8 by 8 blocks) has 256 bytes of luminance (Y) data for the 256 pixels of the macroblock. The blue chrominance (U) and red chrominance (V) data for the pixels of the macroblock are communicated at ¼ resolution, or 64 bytes of U data and 64 byes of V data for the macroblock and filtering is used to blend pixel colors.

The macroblock data output by DCT 110 is further processed by quantization 120. A DCT coefficient is quantized by dividing the DCT coefficient by a nonzero positive integer called a quantization value and rounding the quotient to the nearest integer. See, for example, Joan L. Mitchell, et al., "MPEG Video Compression Standard," Kluwer Academic Publishers, 1996, pages 46–49. The quantized macroblock coefficients are converted from a two-dimensional format (e.g., 16×16 block) to a one-dimensional sequence using a zig-zag scanning order. The sequence resulting from zig-zag transform 130 is a compressible bitstream.

The bitstream output by zig-zag transform 140 is run/level encoded by run/level encoder 140, which converts strings of zeros and non-zero coefficients output from zig-zag transform 130 into number pairs. In typical implementations, run/level code table 150 provides run/level codes for common strings of zeros and associated non-zero coefficients. For combinations not in run/level code table 150, run/level encoder 140 determines the proper run/level code. A runaevel code table that can be used is described in Mitchel, Joan L., et al., "MPEG Video Compression Standard," pages 228–230, published by Kluwer Academic Publishers, 1996. Strings of number pairs are the MPEG-encoded bitstream that carries sufficient information to reconstruct a motion video.

Because of the many steps and the complexity of MPEG encoding as described with respect to FIG. 1, MPEG encoding typically cannot be performed in real time while providing significant levels of compression. Therefore, it is desirable to provide a more efficient MPEG encoding scheme.

SUMMARY

A method for encoding transformation on a set of data. A video frame is represented as frame-based data and as field-based data. Arrays of frame-based data and arrays of field-based data are generated. Either the array of frame-based data or the array of field-based data is selected based, at least in part, on the number of non-zero coefficients in the frame-based data and the field-based data. The coefficients of the arrays of selected data are converted.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for video encoding using Motion Picture Experts Group (MPEG) standard encoding and dynamic selection of field-based or frame-based encoding are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A discrete cosine transform (DCT) level enhancement to MPEG video encoding is described that results in a more concise bitstream than encoding without the enhancement. One degree of freedom provided by the MPEG encoding specifications is whether a frame- or field-based DCT operation will be used. In video transmission, frames are divided into two interlaced fields. One frame includes the odd display lines and the other frame includes the even frame lines.

The decision of whether to perform field-based DCT operations or frame-based DCT operations can be made on a macroblock-by-macroblock basis. In the field-based DCT operations, luminance sub-blocks are built from even or odd rows of data representing the original image, which correspond to the top and bottom fields in field-based video. This allows the encoder to take advantage of the higher correlation between rows for the same field, especially in field-based video with a high level of motion. In one embodiment, both field- and frame-based DCT operations on the data representing the original image are performed and the results are quantized. On a macroblock-by-macroblock basis, the option that results in the fewest non-zero coefficients is selected and those coefficients are used for run-time encoding.

Figure 1:
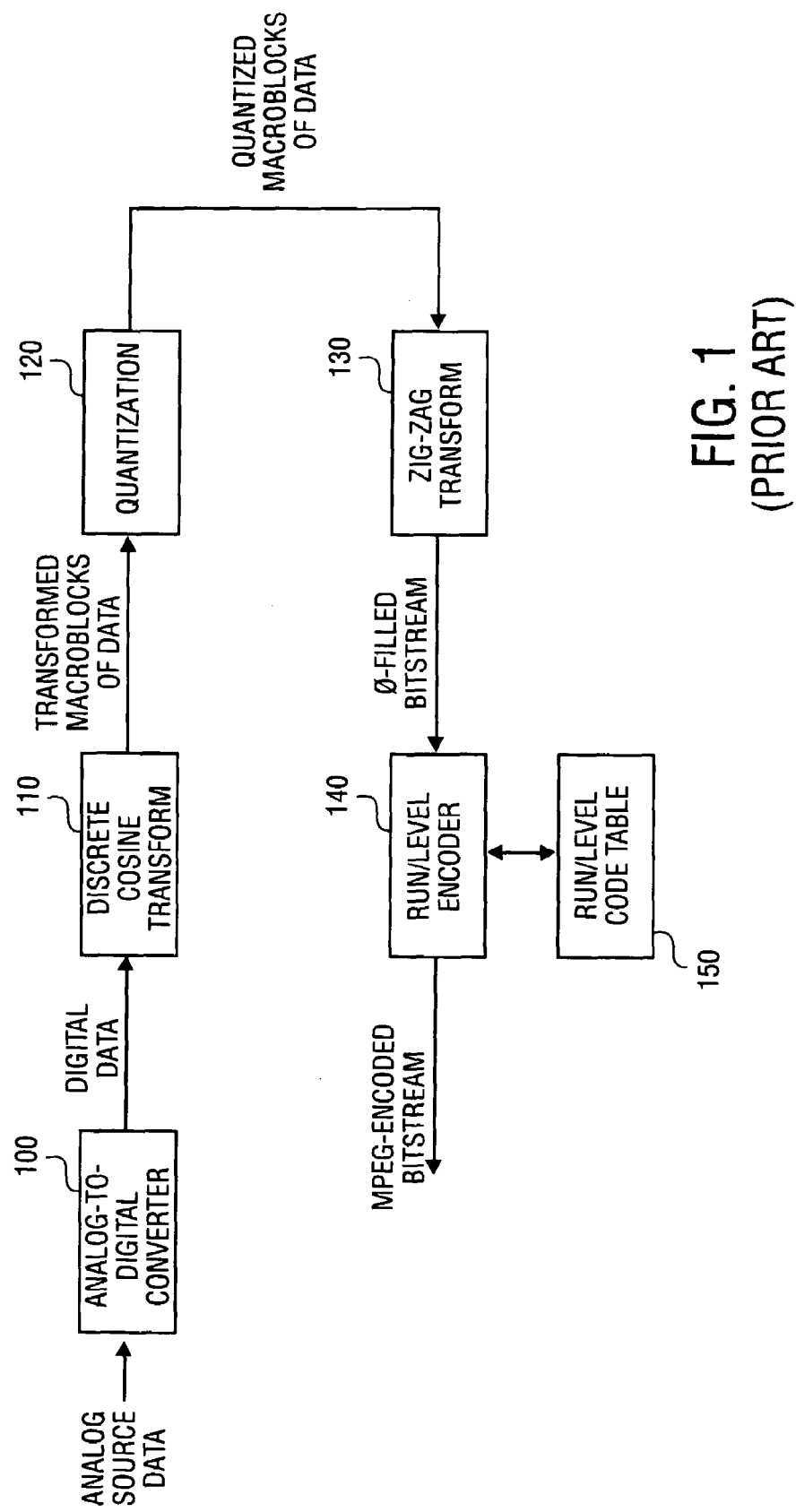
FIG. 1 is a block diagram of a basic Motion Picture Experts Group (MPEG) encoding scheme.
Figure 2:
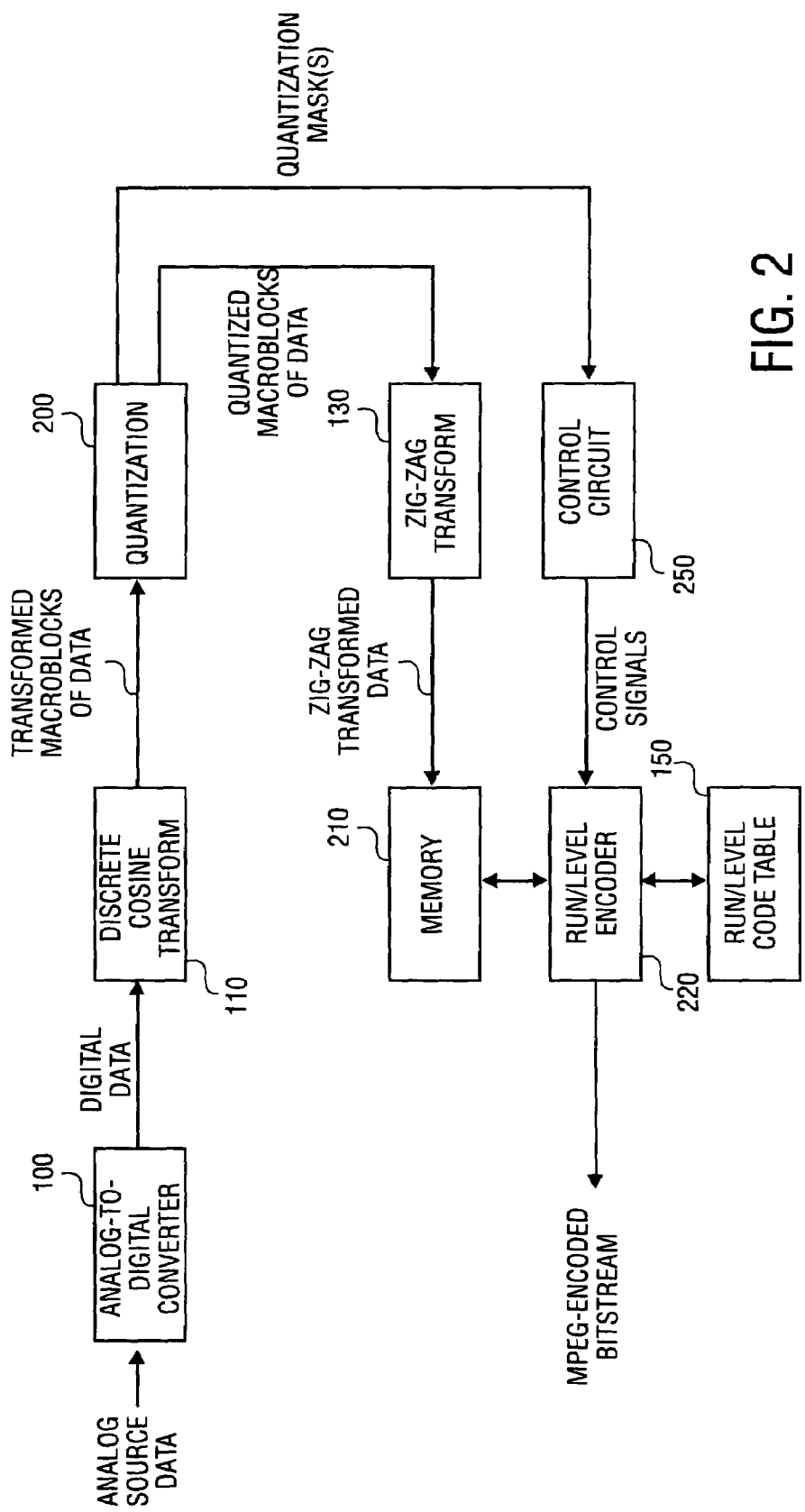
FIG. 2 is a block diagram of a MPEG encoding scheme in which selection between field- or frame-based DCT operations is performed dynamically during encoding.

FIG. 2 is a block diagram of a MPEG encoding scheme in which selection between field- or frame-based DCT operations is performed dynamically during encoding. The various components of the block diagram of FIG. 2 can be implemented as hardware, software or a combination of hardware and software. Thus, the selection of whether a macroblock is to be processed using field- or frame-based DCT operations as well as other portions of MPEG encoding can be any combination of hardware and software.

Analog source data is converted to digital data by analog to digital converter 100. Analog to digital converter 100 can be any analog to digital converter known in the art. If digital data is received, conversion by analog to digital converter 100 is not necessary. The digital data is used as input to discrete cosine transform 110. Various techniques for accomplishing DCT operations are known in the art, an any appropriate technique can be used to convert the digital data to transformed macroblocks of data. The DCT is performed on the digital data in both a field-based format and a frame-based format. DCT operations can be performed by hardware, software or a combination of hardware and software. Both results are provided to quantizer 250.

In general, MPEG encoding strategies attempt to generate the most concise (i.e., the shortest bit stream) representation of encoded video data at a predetermined level of quality. As mentioned above, encoding can be accomplished in a frame-based or a field-based manner and the decision whether to perform field-based transformations or frame-based transformations can be made at the macroblock level. When performing field-based DCT operations, luminance sub-blocks are built from even or odd rows of the original image, which correspond to the top and bottom fields of field-based video. Use of field- or frame-based DCT operations allows the encoder to take advantage of the higher correlation between rows from the same field, especially in field-based video with motion.

A macroblock is a 16×16 block of pixels, in YUV color space, with the chrominance (U and V) channels sub-sampled 4-to-1. The resulting data can be represented as six 8×8 blocks of pixel data: four blocks for the luminance data, and one each for the two chrominance channels. Given our spatial arrangement of pixels, we have:

$$Y = \begin{bmatrix} y_{0,0} & y_{0,1} & y_{0,2} & y_{0,3} & \cdots & y_{0,15} \\ y_{1,0} & y_{1,1} & y_{1,2} & y_{1,3} & \cdots & y_{1,15} \\ \vdots & \vdots & \vdots & \vdots & & \vdots \\ y_{15,0} & y_{15,1} & y_{15,2} & y_{15,3} & \cdots & y_{15,15} \end{bmatrix}$$

-continued $$U = \begin{bmatrix} u_{0,0} & u_{0,1} & u_{0,2} & u_{0,3} & \cdots & u_{0,7} \\ u_{1,0} & u_{1,1} & u_{1,2} & u_{1,3} & \cdots & u_{1,7} \\ \vdots & \vdots & \vdots & \vdots & & \vdots \\ u_{7,0} & u_{7,1} & u_{7,2} & u_{7,3} & \cdots & u_{7,7} \end{bmatrix}$$

$$V = \begin{bmatrix} v_{0,0} & v_{0,1} & v_{0,2} & v_{0,3} & \cdots & v_{0,7} \\ v_{1,0} & v_{1,1} & v_{1,2} & v_{1,3} & \cdots & v_{1,7} \\ \vdots & \vdots & \vdots & \vdots & & \vdots \\ v_{15,0} & v_{15,1} & v_{15,2} & v_{15,3} & \cdots & v_{7,7} \end{bmatrix}$$

In the frame-based DCT mode, a two-dimensional DCT is performed on the U and V channels, with the Y channel being subdivided into four blocks. The two-dimensional DCT is performed on the four Y channel blocks:

$$Y0 = \begin{bmatrix} y_{0,0} & y_{0,1} & \cdots & y_{0,7} \\ y_{1,0} & y_{1,1} & \cdots & y_{1,7} \\ y_{2,0} & y_{2,1} & \cdots & y_{2,7} \\ \vdots & \vdots & & \vdots \\ y_{7,0} & y_{7,1} & \cdots & y_{7,7} \end{bmatrix} \quad Y1 = \begin{bmatrix} y_{0,8} & y_{0,9} & \cdots & y_{0,15} \\ y_{1,8} & y_{1,9} & \cdots & y_{1,15} \\ y_{2,8} & y_{2,9} & \cdots & y_{2,15} \\ \vdots & \vdots & & \vdots \\ y_{7,8} & y_{7,9} & \cdots & y_{7,15} \end{bmatrix}$$

$$Y2 = \begin{bmatrix} y_{8,0} & y_{8,1} & \cdots & y_{8,7} \\ y_{9,0} & y_{9,1} & \cdots & y_{9,7} \\ y_{10,0} & y_{10,1} & \cdots & y_{10,7} \\ \vdots & \vdots & & \vdots \\ y_{15,0} & y_{15,1} & \cdots & y_{15,7} \end{bmatrix} \quad Y3 = \begin{bmatrix} y_{8,8} & y_{8,9} & \cdots & y_{8,15} \\ y_{9,8} & y_{9,9} & \cdots & y_{9,15} \\ y_{10,8} & y_{10,9} & \cdots & y_{10,15} \\ \vdots & \vdots & & \vdots \\ y_{15,8} & y_{7159} & \cdots & y_{15,15} \end{bmatrix}$$

In field-based mode, the luminance data is divided into four blocks using alternating rows of pixel data:

$$Y0 = \begin{bmatrix} y_{0,0} & y_{0,1} & \cdots & y_{0,7} \\ y_{2,0} & y_{2,1} & \cdots & y_{2,7} \\ y_{4,0} & y_{4,1} & \cdots & y_{4,7} \\ \vdots & \vdots & & \vdots \\ y_{14,0} & y_{14,1} & \cdots & y_{14,7} \end{bmatrix} \quad Y1 = \begin{bmatrix} y_{0,8} & y_{0,9} & \cdots & y_{0,15} \\ y_{2,8} & y_{2,9} & \cdots & y_{2,15} \\ y_{4,8} & y_{4,9} & \cdots & y_{4,15} \\ \vdots & \vdots & & \vdots \\ y_{14,8} & y_{14,9} & \cdots & y_{14,15} \end{bmatrix}$$

$$Y2 = \begin{bmatrix} y_{1,0} & y_{1,1} & \cdots & y_{1,7} \\ y_{3,0} & y_{3,1} & \cdots & y_{3,7} \\ y_{5,0} & y_{5,1} & \cdots & y_{5,7} \\ \vdots & \vdots & & \vdots \\ y_{15,0} & y_{15,1} & \cdots & y_{15,7} \end{bmatrix} \quad Y3 = \begin{bmatrix} y_{1,8} & y_{1,9} & \cdots & y_{1,15} \\ y_{3,8} & y_{3,9} & \cdots & y_{3,15} \\ y_{5,8} & y_{5,9} & \cdots & y_{5,15} \\ \vdots & \vdots & & \vdots \\ y_{15,8} & y_{15,9} & \cdots & y_{15,15} \end{bmatrix}$$

In a vector processing environment, performing both field-based and frame-based DCT operations can be accomplished with only a slight performance penalty. With a fast enough processor, both field-based and frame-based DCT operations can be performed while encoding video data in real time. Because the chrominance arrays are processed identically for both field-based and frame-based DCT operations, performing both field- and frame-based DCT operations for a macroblock requires four additional two-dimensional DCT operations on the luminance data.

The resulting transformed macroblock (i.e., the field-based macroblock or the frame-based macroblock) with the fewest non-zero coefficients after quantization generally provides the shortest encoding bit stream. In one embodiment, the quantization level for each macroblock is known prior to the DCT operation, so given a known quantization level, the number of non-zero coefficients to be generated after quantization can be determined without performing the quantization. In an alternate embodiment, quantization is performed and the macroblock having the fewest non-zero coefficients is used for further processing.

In one embodiment, video processing is performed using vector operations. In such an embodiment, the technique described above can be accomplished with four instructions per vector: a vector_compare_greater_than instruction, a vector_compare_less_than instruction, and two vector_subtract instructions. With eight 16-bit elements per vector, this averages 0.5 instructions per coefficient. By performing both filed- and frame-based DCT operations, the two resulting transformed macroblocks can be compared and the transformed macroblock that produces fewer non-zero coefficients can be used for further encoding.

Another, more complex embodiment, can provide a more efficient encoding technique. Higher-order coefficients are typically more resource consuming to encode because the higher-order coefficients typically involve longer zero runs preceding the coefficient than lower-order coefficients. These longer runs correspond to larger entries in the run/level encoding pairs, so these higher-order coefficients are more costly to encode than lower order coefficients.

A method of coefficient weighting can be used to consider this condition for higher-order coefficients and provide a more accurate estimate of the relative resource costs of encoding using frame- and field-based DCT operations. The added computation for this technique is loading each vector of weighting factors (multiplicands), and two vector multiply-add instructions instead of the vector subtractions. The net difference is one additional instruction per eight coefficients.

The selected transformed macroblocks of data whether in field-based format or frame-based format is input to quantizer 250, which performs quantization by dividing each of the coefficients generated by the DCT by a quantization value and the result is rounded. The specific quantization value to be used is independent of the techniques described herein and therefore not described in detail.

The output of quantizer 250 is quantized macroblocks in either field-based format or frame-based format. The macroblock data are transformed using a zig-zag transform. The bit stream is encoded by run/level encoder 140 and run/level code table 150, which outputs a MPEG-encoded bit stream.

Figure 3:
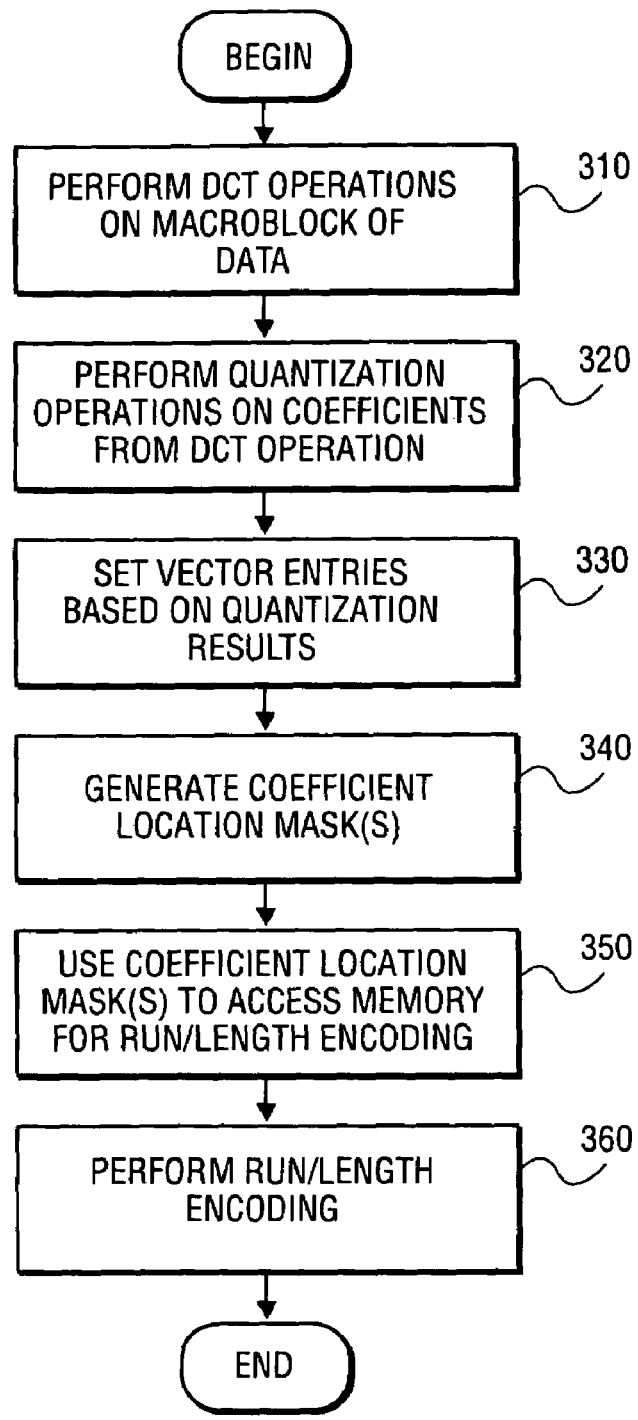
FIG. 3 is a flow diagram of a MPEG encoding scheme in which selection between field- or frame-based DCT operations is performed dynamically during encoding.

FIG. 3 is a flow diagram of a MPEG encoding scheme in which selection between field- or frame-based DCT operations is performed dynamically during encoding. While FIG. 3 is described with respect to a particular operational order, a different operational order can also be used.

A macroblock of video data is received, 310. The macroblock of data includes the YUV values for each of the pixels in a 16×16 block of pixels within a video frame. MPEG encoding uses multiple types of frames (e.g., I, B and P frames). For the technique described herein the type of frame is not relevant.

DCT operations are performed on the two 8×8 blocks of chrominance (U and V) data, 320. Because the DCT operations performed on the chrominance data is the same for frame-based and for field-based encoding, transformation of the chrominance data need only be performed once.

Frame-based DCT operations are performed on the luminance data, 330. The specific data arrays used for frame-based DCT operations are described above. Field-based DCT operations are performed on the luminance data, 340. The specific data arrays used for field-based DCT operations are described above. The more concise transformed luminance data is selected, 350. The more concise luminance data is the transformed luminance data, either frame-based or field-based, that has the lesser number of non-zero coefficients.

Quantization is performed on the chrominance data and on the selected luminance data, 360. The quantized data is run/level encoded, 370. The run/level encoded data is output as a MPEG-encoded bit stream representing the original macroblock of video data.

Figure 4:
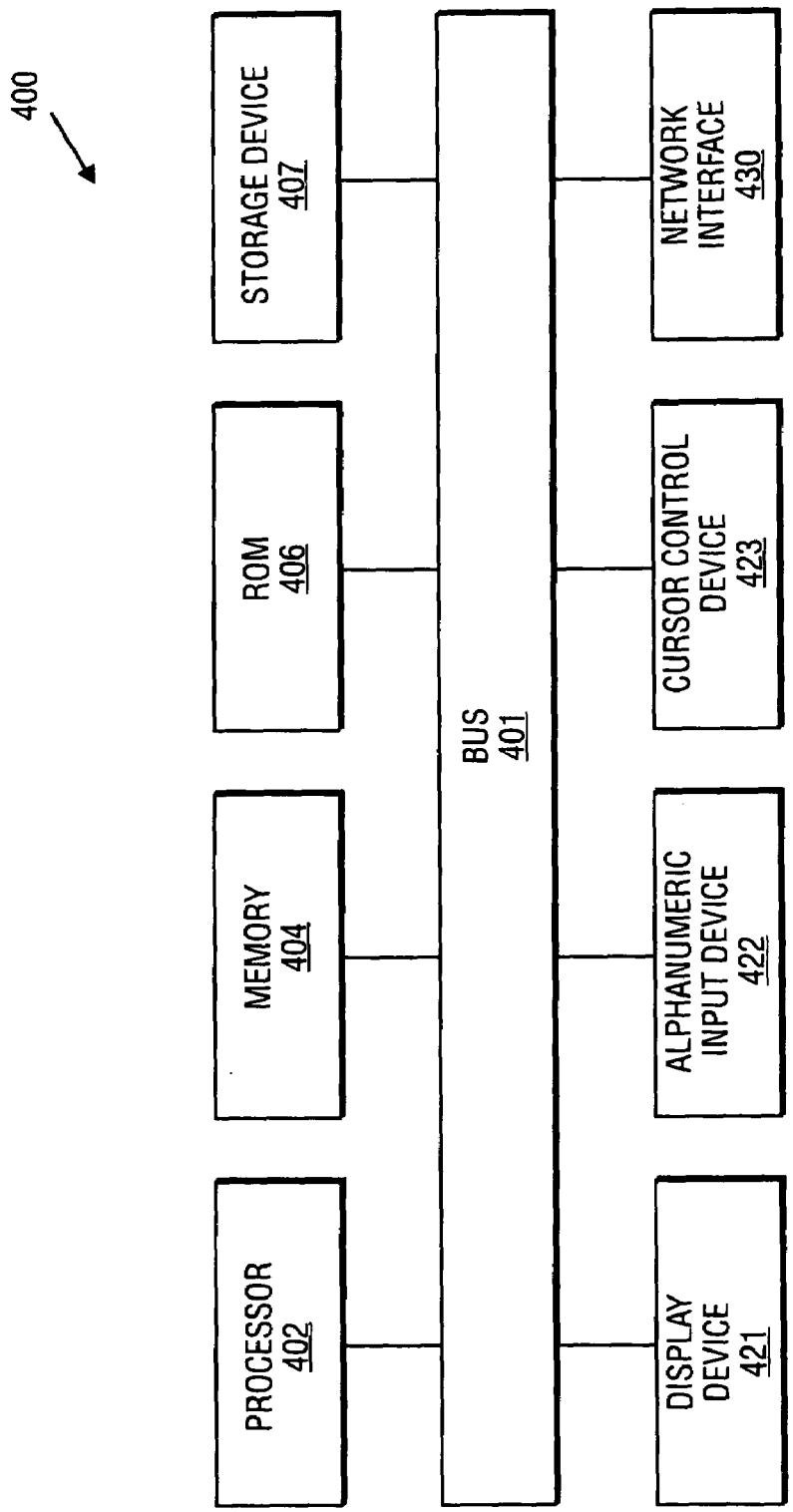
FIG. 4 is a block diagram of one embodiment of an electronic system.

In one embodiment, some or all of the technique of FIGS. 2 and 3 can be implemented as sequences of instructions executed by an electronic system. The sequences of instructions can be stored by the electronic device or the instructions can be received by the electronic device (e.g., via a network connection). FIG. 4 is a block diagram of one embodiment of an electronic system. The electronic system illustrated in FIG. 4 is intended to represent a range of electronic systems, for example, computer systems, network access devices, etc. Alternative electronic systems can include more, fewer and/or different components.

Electronic system 400 includes bus 401 or other communication device to communicate information, and processor 402 coupled to bus 401 to process information. While electronic system 400 is illustrated with a single processor, electronic system 400 can include multiple processors and/or co-processors. Electronic system 400 further includes random access memory (RAM) or other dynamic storage device 404 (referred to as memory), coupled to bus 401 to store information and instructions to be executed by processor 402. Memory 404 also can be used to store temporary variables or other intermediate information during execution of instructions by processor 402.

Electronic system 400 also includes read only memory (ROM) and/or other static storage device 406 coupled to bus 401 to store static information and instructions for processor 402. Data storage device 407 is coupled to bus 401 to store information and instructions. Data storage device 407 such as a magnetic disk or optical disc and corresponding drive can be coupled to electronic system 400.

Electronic system 400 can also be coupled via bus 401 to display device 421, such as a cathode ray tube (CRT) or liquid crystal display (LCD), to display information to a computer user. Alphanumeric input device 422, including alphanumeric and other keys, is typically coupled to bus 401 to communicate information and command selections to processor 402. Another type of user input device is cursor control 423, such as a mouse, a trackball, or cursor direction keys to communicate direction information and command selections to processor 402 and to control cursor movement on display 421. Electronic system 400 further includes network interface 430 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 430) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
performing a first encoding transformation on a set of data representing a video frame as frame-based data to generate an array of frame-based coefficient data including chrominance data and a first representation of luminance data;
performing a second encoding transformation on the set of data representing the video frame as field-based data to generate an array of field-based coefficient data including chrominance data and a second representation of the luminance data;
determining a number of non-zero coefficients within the array of the frame-based data;
determining a number of non-zero coefficients within the array for the field-based data;
selecting either the array of frame-based data or the array of field-based data based, at least in part, on the number of non-zero coefficients in the frame-based data and the field-based data; and
converting an ordering of the arrays of selected data.

2. The method of claim 1 wherein the first encoding transformation and the second encoding transformation each comprise a discrete cosine transform (DCT) operation.

3. The method of claim 2 wherein each encoding transformation further comprises quantization of results of the DCT operation.

4. The method of claim 1 wherein selecting either the arrays of frame-based data or field-based data based, at least in part, on the number of non-zero coefficients in the frame-based data and the field-based data comprises:
comparing a macroblock of frame-based data to a macroblock of field-based data; and
selecting the macroblock of data having the fewer number of non-zero coefficients.

5. The method of claim 1 wherein converting an ordering of the arrays of frame-based data coefficients and of the arrays of field-based data coefficients comprises performing a zig-zag conversion wherein an 8×8 matrix having an original order of:

| | | | | | | | |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 | are converted to having a scanning order of:

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 31 |
| 35 | 36 | 48 | 49 | 57 | 58 | 62 | 63 |

6. An article of manufacture comprising electronically-accessible medium to provide instructions that, when executed, by one or more processors, cause one or more electronic systems to:
perform a first encoding transformation on a set of data representing a video frame as frame-based data to generate an array of frame-based coefficient data including chrominance data and a first representation of luminance data;
perform a second encoding transformation on the set of data representing the video frame as field-based data to generate an array of field-based coefficient data including chrominance data and a second representation of the luminance data;
determine a number of non-zero coefficients within the array of the frame-based data;
determine a number of non-zero coefficients within the array for the field-based data;
select either the array of frame-based data or the array of field-based data based, at least in part, on the number of non-zero coefficients in the frame-based data and the field-based data; and
convert an ordering of the arrays of selected data.

7. The article of claim 6 wherein the instructions that cause the one or more electronic systems to perform encoding transformation comprise instructions that, when executed, cause the one or more electronic systems to perform a first discrete cosine transform (DCT) operation on the data representing the video frame to generate the frame-based data and a second DCT operation on the data representing the video frame to generate the field-based data.

8. The article of claim 7 wherein the instructions that cause the one or more electronic systems to perform encoding transformation further comprises instructions that, when executed, cause the one or more electronic systems to perform quantization of results of the DCT operations.

9. The article of claim 6 wherein the instructions that cause the one or more electronic systems to select either the arrays of frame-based data or field-based data based, at least in part, on the number of non-zero coefficients in the frame-based data and the field-based data comprises instructions that, when executed, cause the one or more electronic systems to:

compare a macroblock of frame-based data to a macroblock of field-based data; and
select the macroblock of data having the fewer number of non-zero coefficients.

10. The article of claim 6 wherein the instructions that cause the one or more electronic systems to convert an ordering of the arrays of frame-based data coefficients and of the arrays of field-based data coefficients comprises instructions that, when executed, cause the one or more electronic systems to perform a zig-zag conversion wherein an 8×8 matrix having an original order of:

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 | are converted to having a scanning order of:

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 31 |
| 35 | 36 | 48 | 49 | 57 | 58 | 62 | 63. |

11. An apparatus comprising:
means for performing a first encoding transformation on a set of data representing a video frame as frame-based data to generate an array of frame-based coefficient data including chrominance data and a first representation of luminance data;
means for performing a second encoding transformation on the set of data representing the video frame as field-based data to generate an array of field-based coefficient data including chrominance data and a second representation of the luminance data;
means for determining a number of non-zero coefficients within the array of the frame-based data;
means for determining a number of non-zero coefficients within the array for the field-based data;
means for selecting either the array of frame-based data or the array of field-based data based, at least in part, on the number of non-zero coefficients in the frame-based data and the field-based data; and
means for converting an ordering of the arrays of selected data.

12. The apparatus of claim 11 wherein the means for encoding transformation performs a first discrete cosine transform (DCT) operation on the data representing the video frame to generate the frame-based data and a second DCT operation on the data representing the video frame to generate the field-based data.

13. The apparatus of claim 12 wherein the means for encoding transformation further comprises means for quantization of results of the DCT operations.

14. The apparatus of claim 11 wherein the means for selecting either the arrays of frame-based data or field-based data based, at least in part, on the number of non-zero coefficients in the frame-based data and the field-based data comprises:
means for comparing a macroblock of frame-based data to a macroblock of field-based data; and
means for selecting the macroblock of data having the fewer number of non-zero coefficients.

15. The apparatus of claim 11 wherein the means for converting an ordering of the arrays of frame-based data coefficients and of the arrays of field-based data coefficients comprises means for performing a zig-zag conversion wherein an 8×8 matrix having an original order of:

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 | are converted to having a scanning order of:

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 31 |
| 35 | 36 | 48 | 49 | 57 | 58 | 62 | 63. |

* * * * *